UNITED STATES PATENT OFFICE.

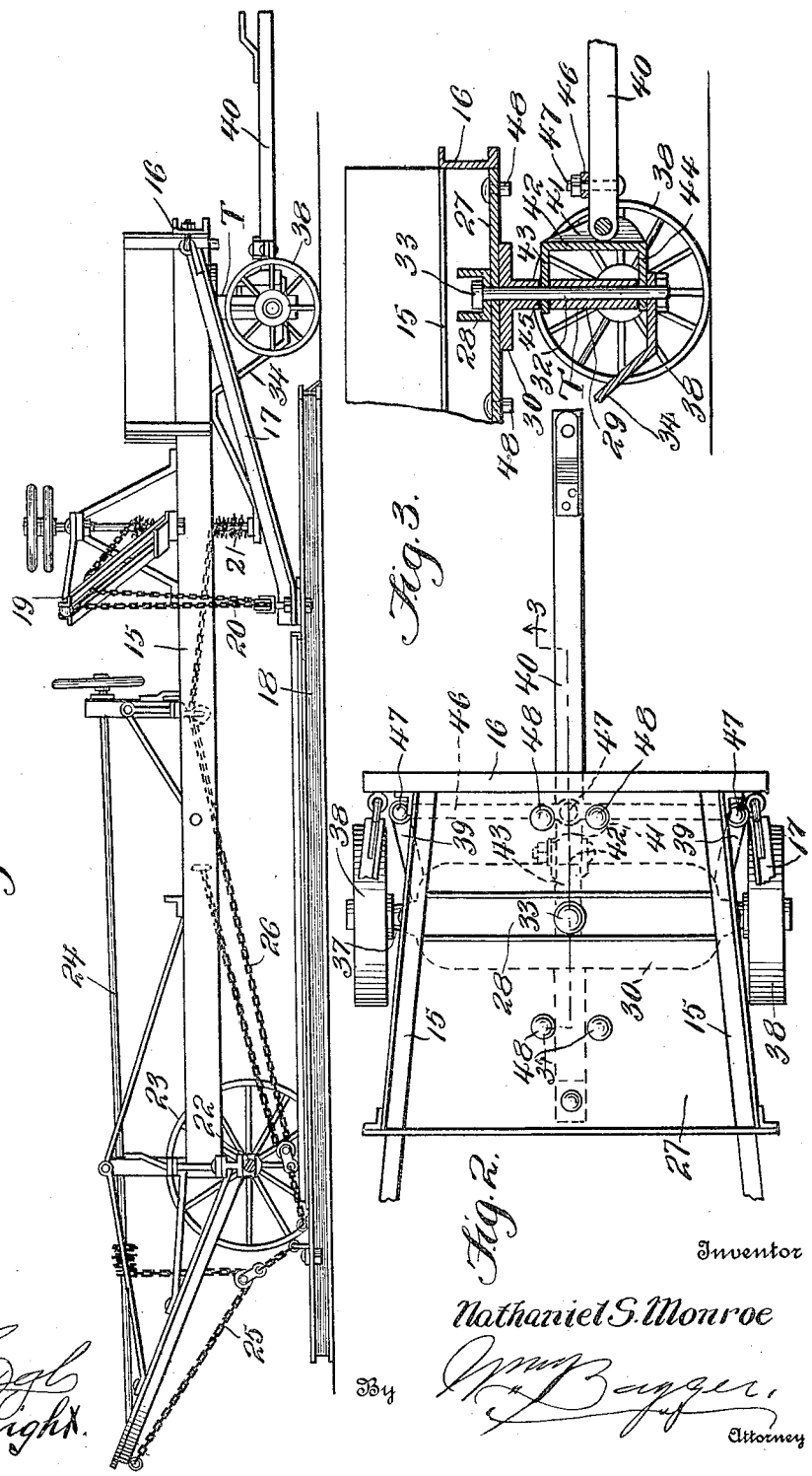

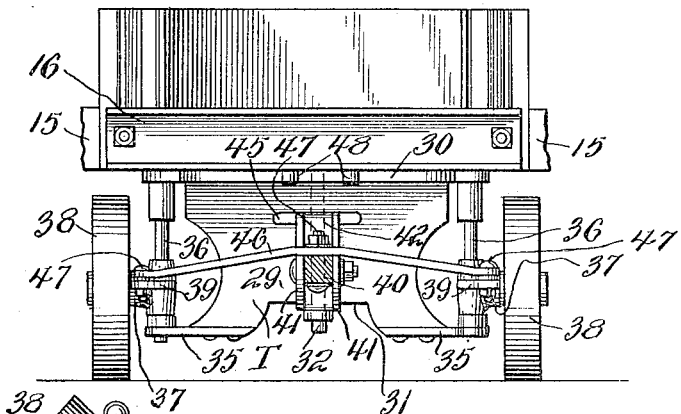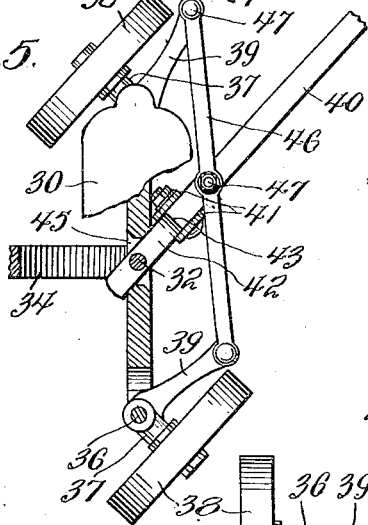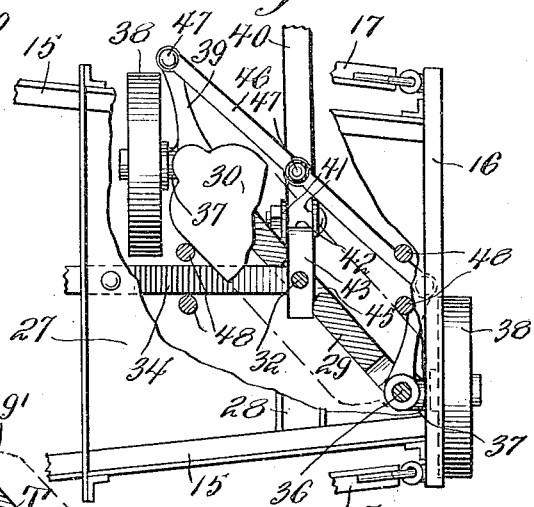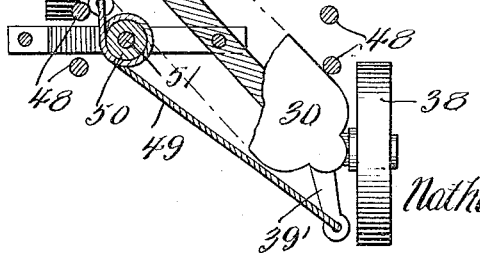

NATHANIEL S. MONROE, OF ARTHUR, ILLINOIS.

TRUCK FOR ROAD-LEVELING MACHINES.

1,133,875.  Specification of Letters Patent.  Patented Mar. 30, 1915.

Application filed July 17, 1913. Serial No. 779,439.

*To all whom it may concern:*

Be it known that I, NATHANIEL S. MONROE, a citizen of the United States, residing at Arthur, in the county of Douglas and State of Illinois, have invented certain new and useful Improvements in Trucks for Road-Leveling Machines, of which the following is a specification.

This invention relates to road leveling machines of the type for which Letters Patent of the United States No. 1015820 were issued to me on the 30th day of January, 1912, and it has particular reference to the truck for supporting the front end of the frame and the steering gear associated therewith.

One object of the invention is to produce an improved steering mechanism of simple and effective construction including ground wheels, the spindles of which extend from vertical shafts from which cranks extend, whereby said shafts may be turned, the truck being mounted on a king bolt so that when the ground wheels have been turned to the limit of their movement the truck itself will turn until the wheels are positioned substantially at right angles with respect to the frame or as nearly so as may be desired, thus enabling a turn to be made in the shortest possible radius.

A further object of the invention is to provide a steering truck whereby practically the entire width of the frame of the machine shall be supported at all times while turning, thereby minimizing or avoiding the danger of tipping or tilting sidewise, this being particularly important in machines of this class employing a relatively long and narrow frame and where there is danger of the frame tilting and becoming jammed in the act of turning.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation diagrammatically showing a road leveling machine of the type referred to equipped with the improved front or steering truck. Fig. 2 is a top plan view, enlarged, of the front portion of the truck. Fig. 3 is a vertical sectional view taken on the line 3—3 in Fig. 2. Fig. 4 is a front elevation, the tongue being shown in section. Fig. 5 is a top plan view of the truck, showing the wheels partly turned in the act of steering. Fig. 6 is a top plan view of the truck, showing the wheels positioned substantially at right angles to the frame of the machine of which the outline only appears, parts being broken away. Fig. 7 is a top plan view similar to Fig. 6, but illustrating a modification, especially applicable to a motor driven machine and of which a steering shaft is shown in connection with the truck.

Corresponding parts in the several figures are denoted by like characters of reference.

The frame of the improved machine includes the side members 15 which converge forwardly and which are connected together at the front end by a channel bar 16. The channel bar 16 extends terminally beyond the frame bars 15, and with the ends thereof are connected the front ends of the link bars or braces 17, the rear ends of which are connected with the scraper bars, one of which is shown at 18 in Fig. 1. Means is provided including at each side of the machine a derrick 19 and tackle 20 for lifting the front ends of the scrapers, the tackle being connected with the drum shaft 21. The rear end of the frame is supported on an axle 22 having ground wheels 23, and a longitudinal drum shaft 24 is provided, serving in connection with the tackle 25 for lifting the rear ends of the scrapers. Means including tackle 26 is also provided for adjusting the scrapers longitudinally with respect to the frame.

The front end of the frame has a platform 27 on which is supported a transverse channel bar 28, whereby the construction is materially reinforced. The front truck T consists of a web portion 29 having a cap plate 30. The web portion 29 has a recess 31 at its underside, and it is vertically apertured for the passage of the king bolt 32, said king bolt extending also through the platform 27 and the channel bar 28 in which the head 33 of the bolt is located. The lower end of the king bolt is connected with a brace 34 associated with the frame of the machine.

The web portion of the truck is provided at its lower edge, at either side of the recess 31, with bearing plates 35 affording bearings for the lower ends of shafts 36, bearings for the upper ends of which are provided on the cap plate 30 which extends terminally beyond the web 29, as clearly seen in Fig. 4. The shafts 36 are provided with spindles 37 supporting the front ground wheels 38, and said shafts also have crank arms 39 extending substantially at right angles to the spindles. These arms may extend forwardly with respect to the truck, as seen in Figs. 3, 4, 5 and 6, where the steering movement is effected by means of a tongue. When the steering movement is to be effected by a steering shaft, as seen in Fig. 7, the arms, here designated by 39', extend rearwardly with respect to the truck.

Referring to Figs. 1 to 6, inclusive, 40 designates a tongue which is pivoted for movement in a vertical plane on a flange 41 associated with a yoke or clip 42 having upper and lower limbs 43, 44 which are pivoted on the king bolt 32. The web portion 29 of the truck is provided with a slot 45 for the admission of the upper limb 43, the lower limb 44 being pivoted on the king bolt adjacent to the lower edge of the web portion 29, between said web portion and the brace 34. A bar 46 is pivotally connected with the tongue by a pin or bolt 47 extending vertically therethrough, and the ends of said bar are pivotally connected with the arms 39 by pins or pivot members 47.

Lugs or stop members 48 associated with and depending from the platform 27 are arranged in the path of the cap plate 30 of the truck so as to limit the swinging movement of the latter about the axis of the king bolt.

In the operation of this device, it will be readily seen that when the tongue 40 is swung to one side about the axis of the king bolt, the bar 46 will swing the wheel carrying shafts 36 about their respective axes until the movement is interrupted by the limb 43 of the yoke 42 engaging the side walls of the slot 45, as will be clearly seen in Fig. 5. Until this point is reached, the position of the truck will remain practically unchanged, due to the frictional engagement of the cap plate 30 with the underside of the platform 27. If the lateral strain upon the tongue is continued the truck will now swing bodily about the axis of the king bolt until the movement is interrupted by the lugs or stop members 48, which latter obviously may be positioned to interrupt the movement of the truck when the ground wheels 38 are approximately at right angles to the frame of the machine, as seen in Fig. 6, or at some other predetermined point which shall be found most convenient for the purpose of enabling the machine to be turned in a short radius.

In Figs. 1 to 6, inclusive, has been shown the preferred construction of the invention as applied to a machine that is operated either by animal power or by a tractor; a short tongue having been shown that is adapted to be connected with a tractor. When the motive power is supplied by a motor mounted on the frame of the machine, the modified construction illustrated in Fig. 7 will be found preferable. Under this construction the crank arms extending from the shafts 36, and here designated by 39', extend rearwardly with respect to the truck, and said arms are connected together by a flexible element, such as a cable 49 which is wound one or more times around a drum 50 on a steering shaft 51 which may be operated manually or otherwise for the purpose of actuating the truck and the steering mechanism, the operation being substantially the same as previously described.

It will be seen from the foregoing description, taken in connection with the drawings hereto annexed, that I have provided a very simple and effective supporting and steering truck which is particularly adapted to be used in connection with road leveling machines of the type referred to which, owing to their great weight and to the relatively long and narrow frame structure, require to be supported in a manner that will minimize the danger of lateral tilting and consequent binding or wedging of the frame with respect to the truck, it being also necessary to provide a truck and steering gear that will enable the turn of the machine to be effected in the smallest possible radius. The broad cap plate of the improved truck herein shown at all times extends beneath and in engagement with the front platform of the frame of the machine which is thus supported against tilting, and the steering mechanism, which does not entirely depend upon the turning of the wheel carrying shafts in their bearings, but which is augmented by the fact that the truck itself turns about the king bolt has been found extremely useful and efficient for the purposes set forth.

The mere mechanical and structural details of this device may be changed in various ways without effecting the utility of the invention, and I, therefore, do not limit myself to the precise details shown.

Having thus described the invention, what is claimed as new, is:—

1. A machine frame having a front platform, a channel bar extending across the platform, a king bolt extending through the channel bar and the platform, a brace connecting the lower end of the king bolt with the platform, a truck frame pivoted on the king bolt, vertical shafts journaled in the truck frame and having ground wheel carrying spindles, and means for rocking the shafts with respect to the truck frame and the latter with respect to the king bolt.

2. A machine frame, a truck frame having a slot, a king bolt connecting the machine frame with the truck frame, a yoke pivoted on the king bolt, one limb of said yoke extending through the slot in the truck frame, a tongue connected with the yoke, steering knuckles journaled on the truck frame, said knuckles including vertical shafts having ground wheel carrying spindles and radially extending arms, and a bar pivotally connected with said arms and with the tongue.

3. A machine frame having a platform, a truck frame supporting the platform and having wheel carrying steering knuckles, a king bolt connecting the truck frame with the machine frame, means for rocking the steering knuckles with respect to the truck frame and the latter with respect to the king bolt, and stop members depending from the platform of the machine frame and lying in the path of the truck frame for limiting the rocking movement of the truck frame.

4. A machine frame, a truck frame, a king bolt connecting the truck frame with the machine frame, steering knuckles including vertical shafts journaled on the truck frame and having ground wheel carrying spindles and radially extending arms, a yoke pivoted on the king bolt, a tongue connected with the yoke, and a bar connected pivotally with the tongue and with the radial arms of the steering knuckles; the truck frame including a relatively broad cap plate affording support to the machine frame, and the latter being provided with stop members disposed in the path of the truck frame to limit the swinging movement of the latter about the axis of the king bolt.

In testimony whereof I affix my signature in presence of two witnesses.

NATHANIEL S. MONROE.

Witnesses:
E. W. BOYD,
JAMES E. MORRIS.

Copies of this patent may be obtained for five cents each, by addressing the "Commissioner of Patents, Washington, D. C."